Figure 1:
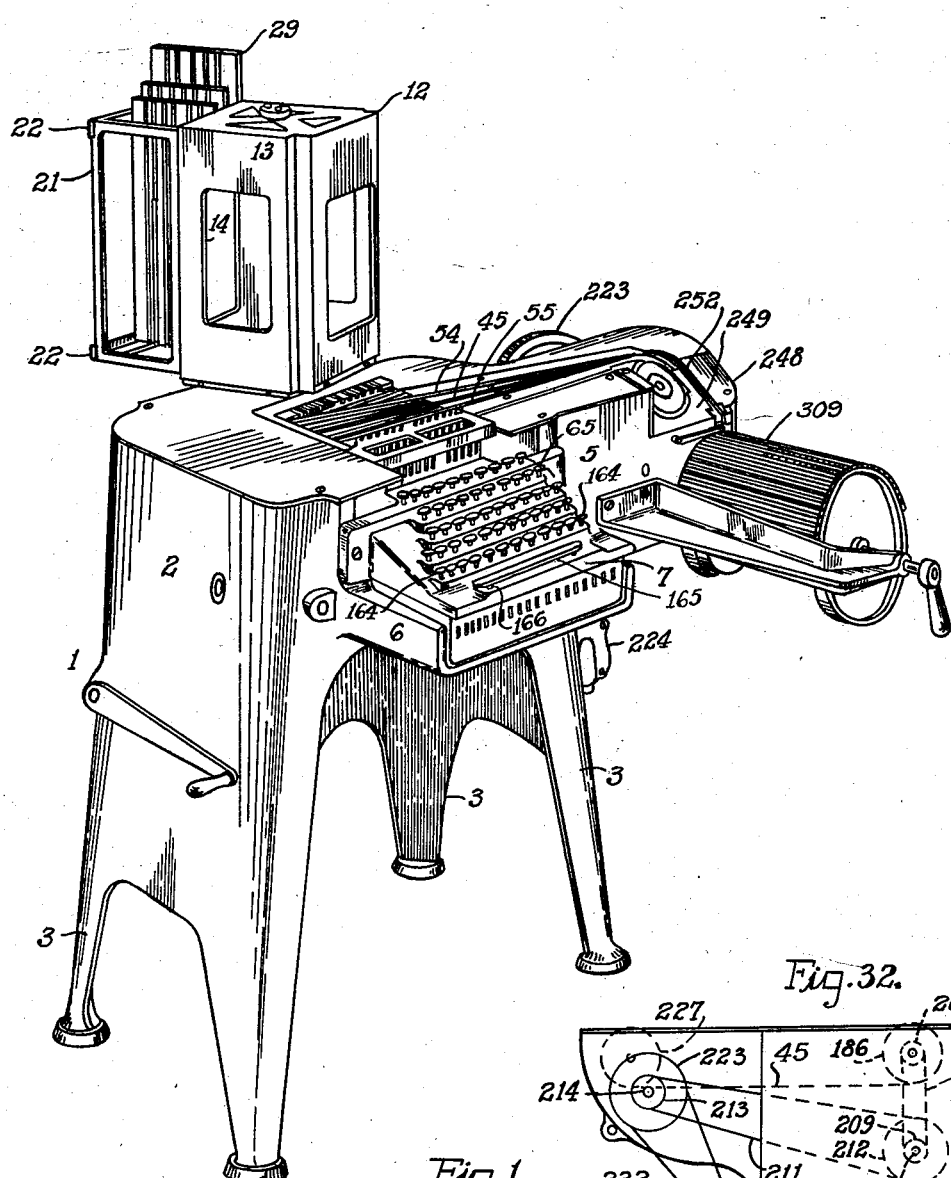

Sept. 14, 1937.    F. H. POEPPELMEIER    2,092,856
TYPE COMPOSING MACHINE
Filed April 13, 1936    8 Sheets-Sheet 1

INVENTOR,
Frank H. Poeppelmeier,
BY Howard D. Smith.
ATTORNEY

Sept. 14, 1937.    F. H. POEPPELMEIER    2,092,856
TYPE COMPOSING MACHINE
Filed April 13, 1936    8 Sheets-Sheet 2
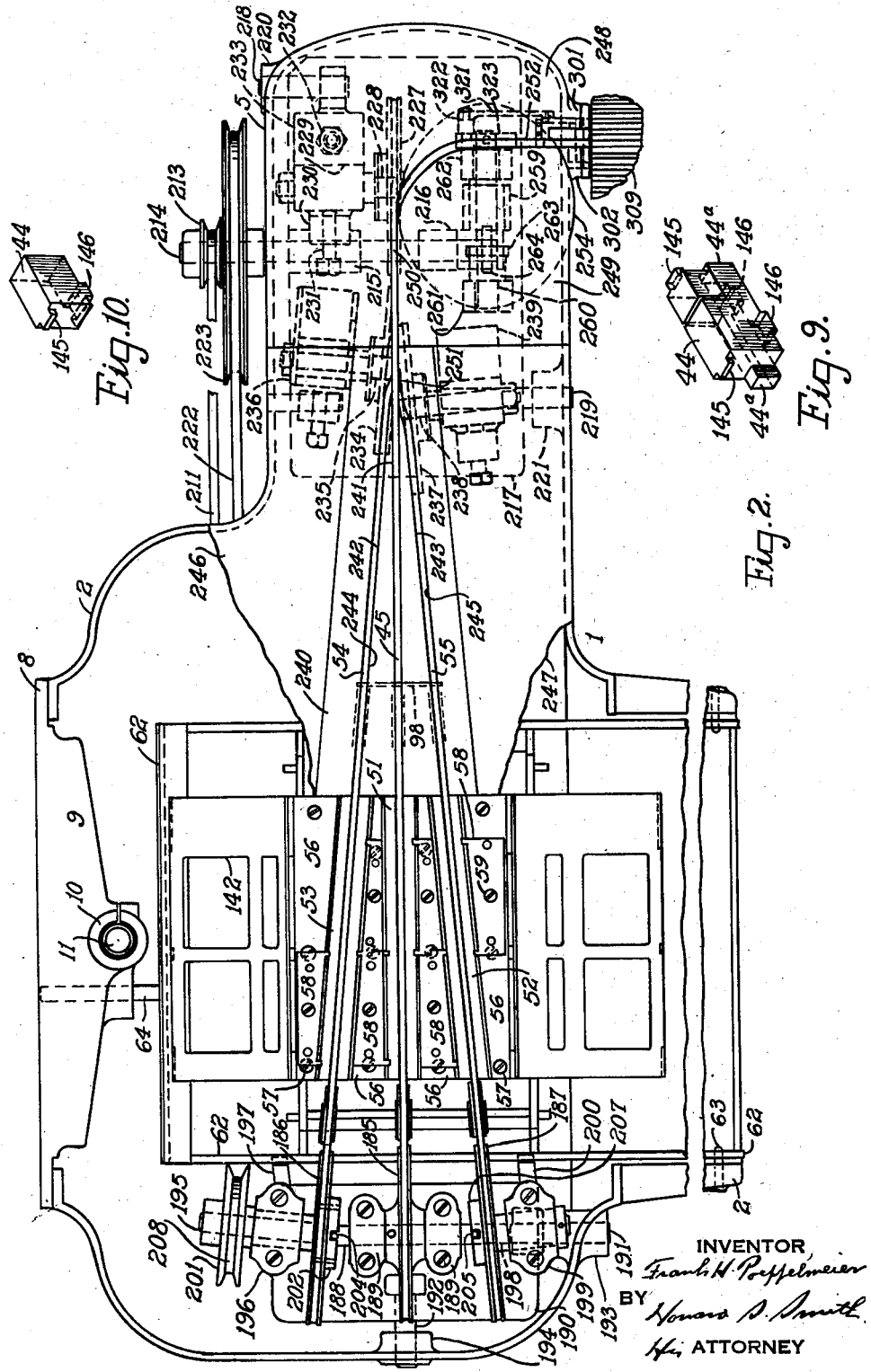

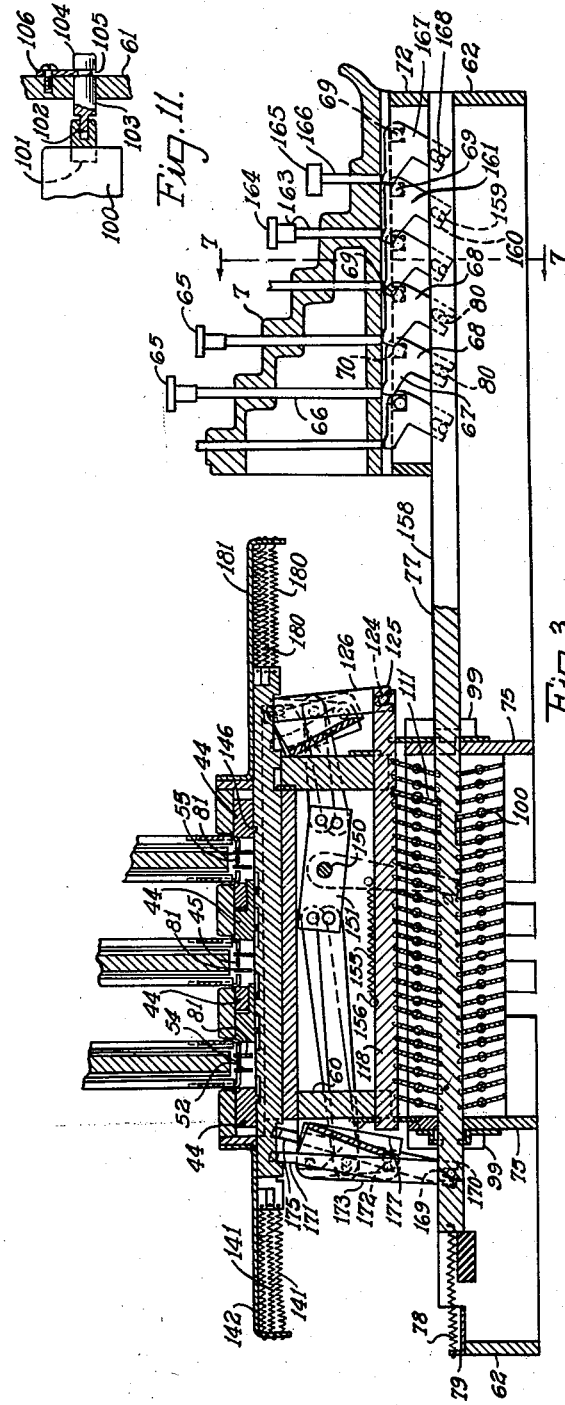

Sept. 14, 1937.　　　F. H. POEPPELMEIER　　　2,092,856
TYPE COMPOSING MACHINE
Filed April 13, 1936　　　8 Sheets-Sheet 4

INVENTOR,
Frank H. Poeppelmeier,
BY
His ATTORNEY

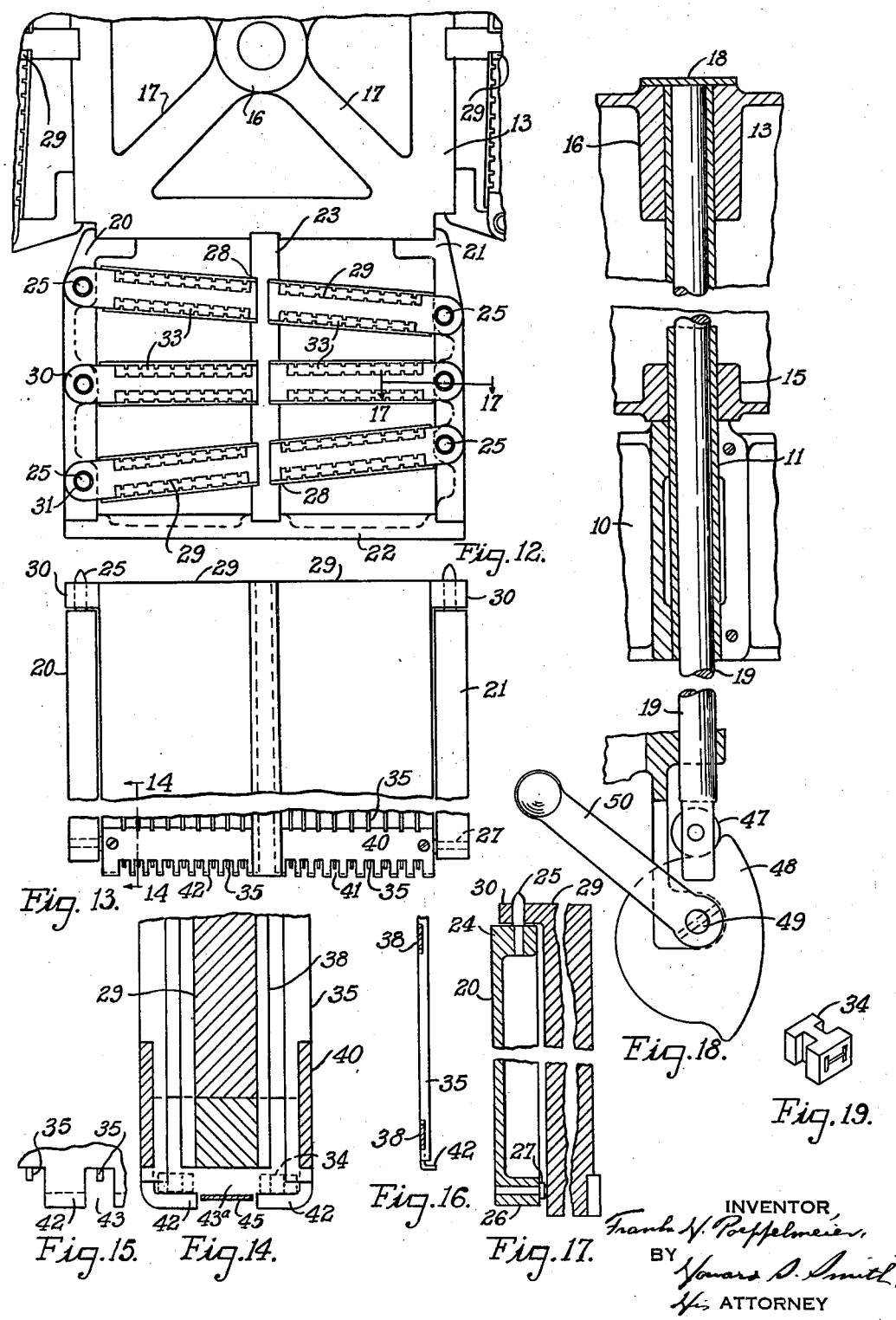

Sept. 14, 1937.   F. H. POEPPELMEIER   2,092,856
TYPE COMPOSING MACHINE
Filed April 13, 1936     8 Sheets-Sheet 6

INVENTOR,
Frank H. Poeppelmeier,
BY
Howard D. Smith,
ATTORNEY

Sept. 14, 1937.  F. H. POEPPELMEIER  2,092,856
TYPE COMPOSING MACHINE
Filed April 13, 1936   8 Sheets-Sheet 7
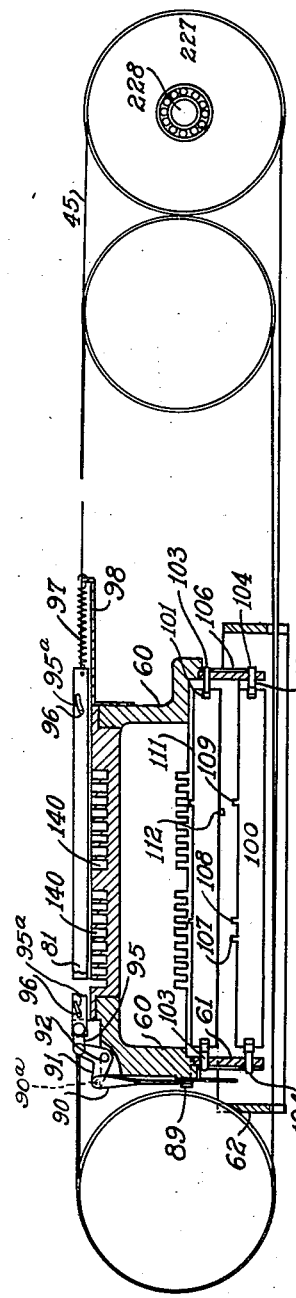
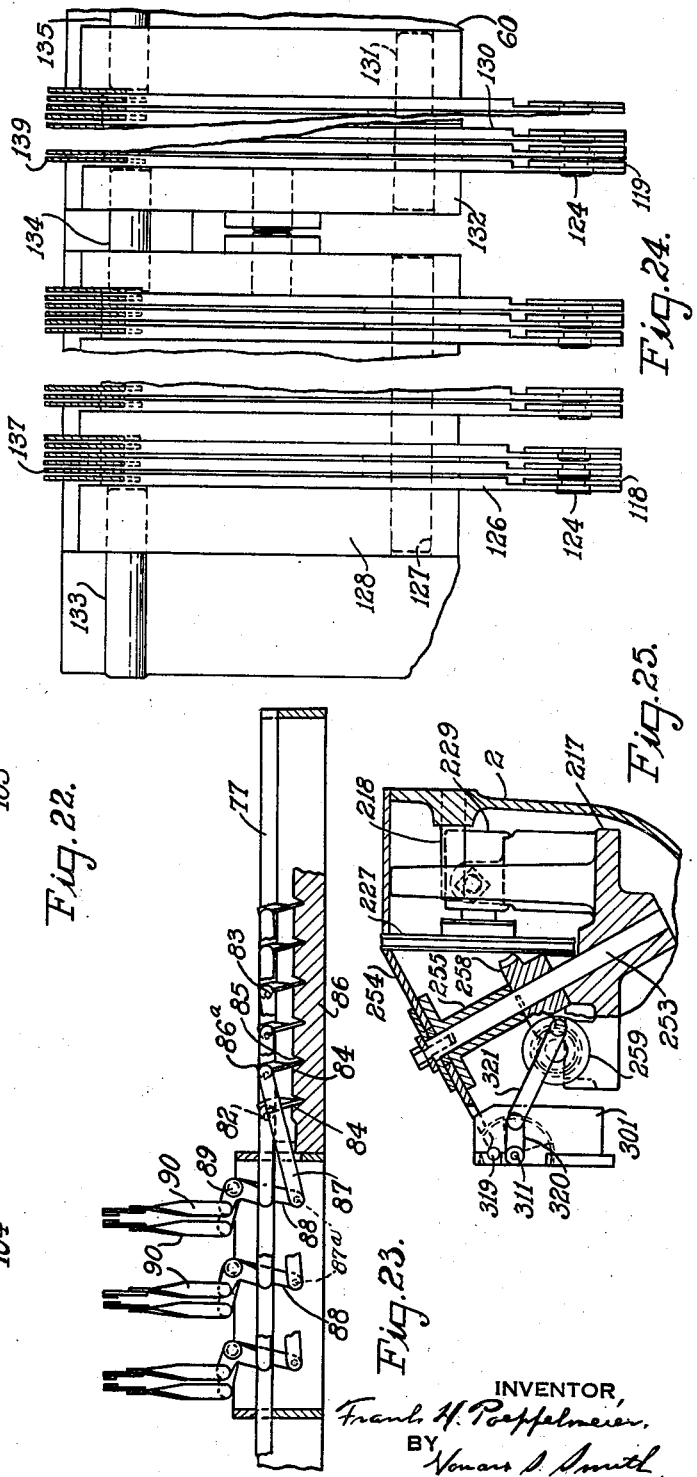
INVENTOR,
Frank H. Poeppelmeier.
BY
Howard S. Smith
his ATTORNEY

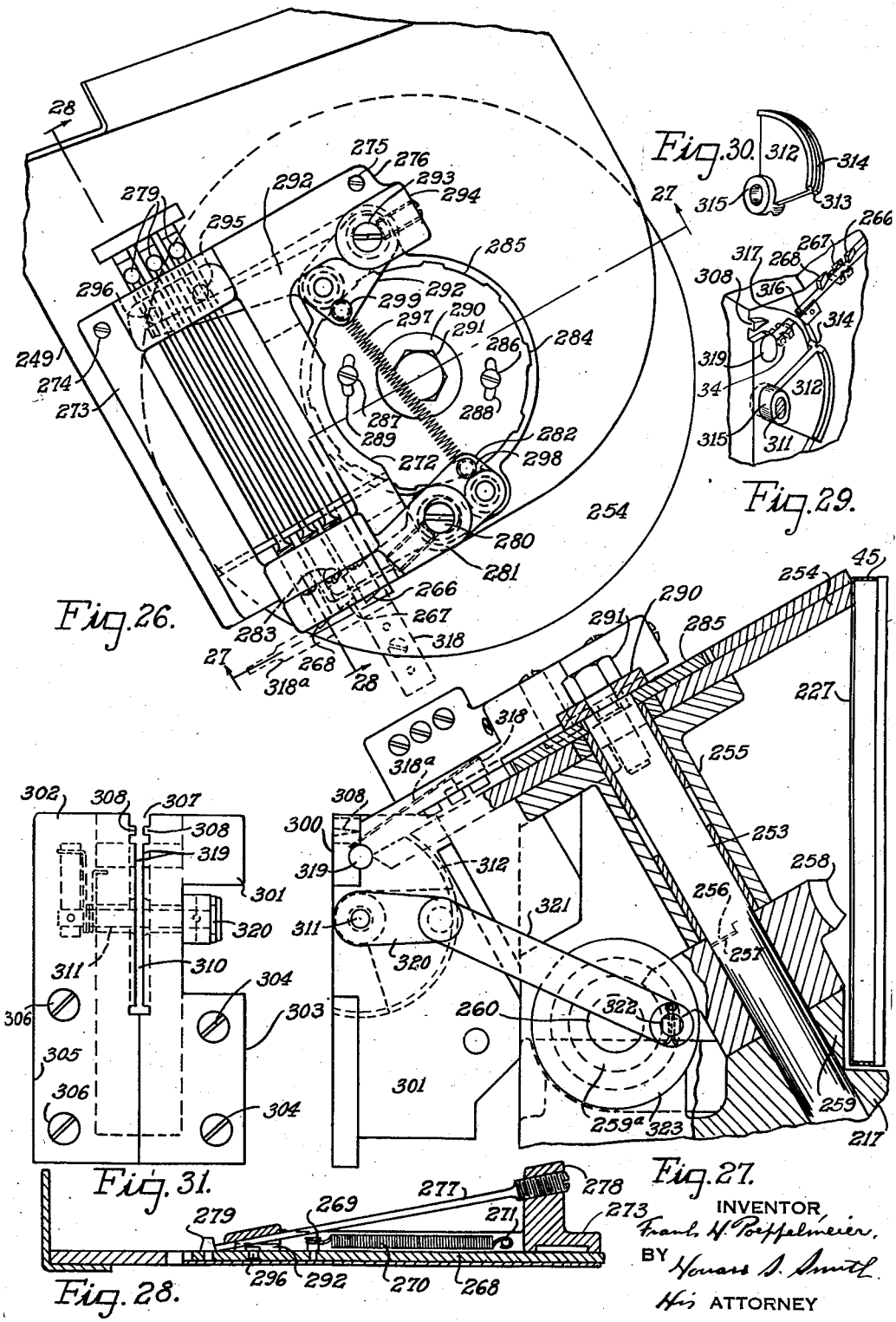

Patented Sept. 14, 1937

2,092,856

UNITED STATES PATENT OFFICE 2,092,856

TYPE COMPOSING MACHINE

Frank H. Poeppelmeier, Dayton, Ohio, assignor to Econotype, Inc., Dayton, Ohio, a corporation of Delaware Application April 13, 1936, Serial No. 74,137

39 Claims. (Cl. 276—3)

This invention relates to new and useful improvements in type composing machines.

It is one of the principal objects of this invention to provide a compact, economical and efficient machine for composing printer's type of varying thicknesses, or set-wise sizes.

Another object of my invention is to provide a composing machine which will accommodate type having both narrow and wide bodies, and in a manner to leave at all times the proper white space between the characters. For example, narrow type bodies carrying the i and l characters, and wide bodies carrying the m and w characters, will be equally accommodated by this machine.

It is another object of the invention to provide such a type composing machine which will accommodate type from two point set-wise size up to and including fourteen point set-wise size. The machine will also take care of type from eight point body size, up to and including twelve point body size.

It is another object of my invention to provide means for ejecting type sidewise from opposite directions from a magazine onto conveying belts that travel beneath the latter. This makes possible a condensed form of magazine. For example, it is possible with my machine to handle 100 type characters within an area of 18 square inches.

Another object of my invention is to provide a machine that will automatically set pre-cast, movable, standard widths of print type in composition form.

It is a further object of my invention to provide a type composing machine that can be successfully operated by the ordinary typist.

It is another object of my invention to provide a type composing machine in which the type are conveyed in a horizontal position from the ejector to their final destinations in the type-receiving channels.

Another object of my invention is to provide a type composing machine in which all of the composing operations can be easily performed while the operator remains seated in a comfortable position. In the same position it is possible for the operator to obtain four distinct styles of type faces by swinging the magazine turret that carries them into the operating position, while at the same time it is possible for that operator to index the receiving mechanism to make any corrections that may be necessary in the composition. Because of the close proximity of the operator to the type-receiving mechanism, it is also possible for her to make a quick and easy visual inspection of the work being accomplished without a change of posture while composing.

While in the same seated position it is also possible for the operator to take a proof of the net results of the composition, thereby obviating the usual procedure of taking a proof from a separate piece of equipment.

It is another object of my invention to provide a type composing machine in which there is incorporated a means that will permit the operation of but one key at a time, thereby removing the possibility of transposition of characters.

It is a further object of the invention to provide a type composing machine in which the copyholder, magazine, and delivery and receiving mechanism are all in the direct line of vision of the operator.

Other important and incidental objects will be brought out in the following specification, and particularly set forth in the subjoined claims.

Figure 4:
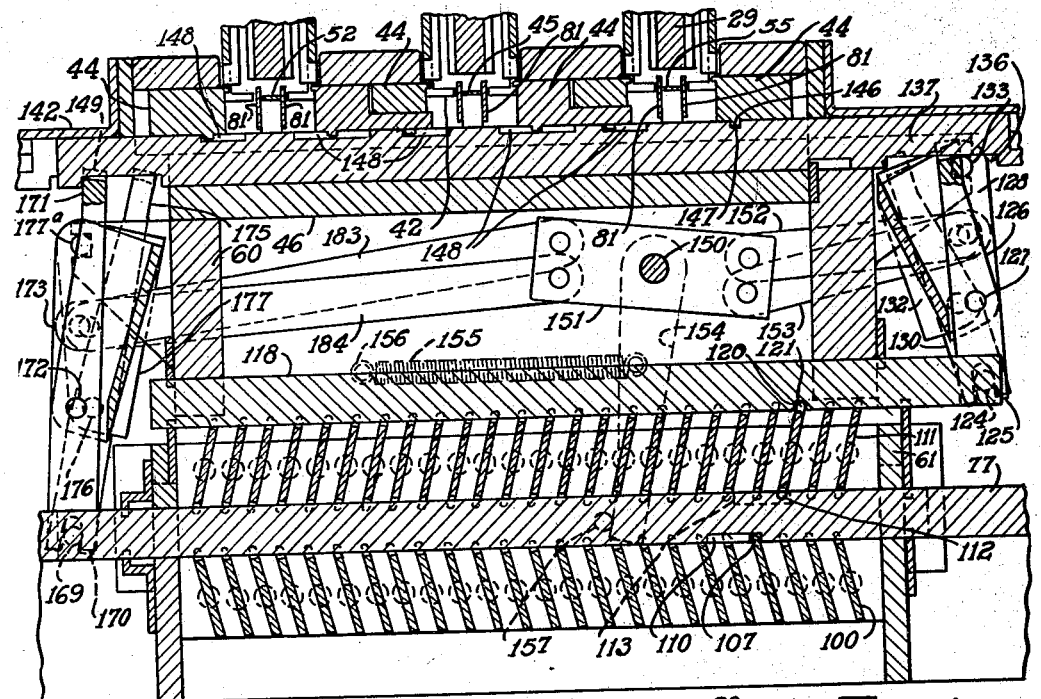
Figure 5:
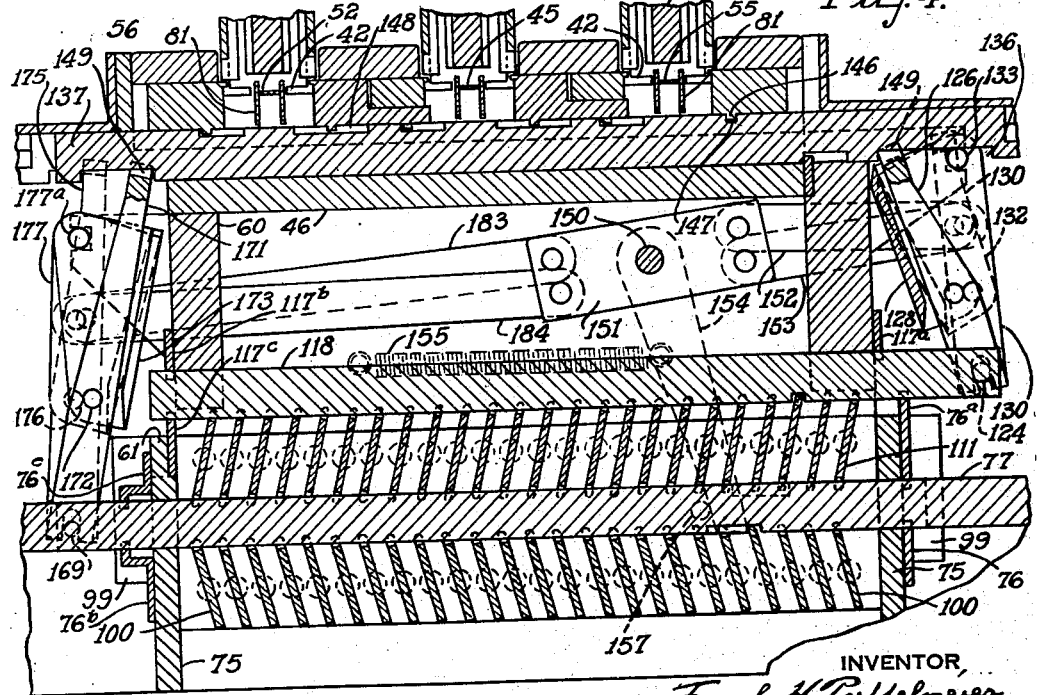

In the accompanying drawings illustrating the invention, Figure 1 is a perspective view of my type composing machine. Figure 2 is a top plan view of the machine, with the magazine turret removed. Figure 3 is a cross-sectional view taken through the machine. Figure 4 is a cross-sectional view taken through that part of the machine which contains the mechanism for discharging type from the magazines, showing the lower case shuttle levers in position to actuate the shuttle bars that control the discharge of lower case type from the magazines. Figure 5 is a cross sectional view taken through the same portion of the machine, showing the upper case shuttle levers in position to actuate the shuttle bars that control the discharge of upper case type from the magazines. Figure 6 is a perspective view of the key bar mounting frame. Figure 7 is a sectional view taken through the keyboard and its support on the line 7—7 of Figure 3. Figure 8 is a sectional view taken through that portion of the machine which supports the toggle mechanism for changing the positions of the shuttle levers. Figure 9 is a perspective view of one of the double shuttles.

Figure 10 is a perspective view of one of the end shuttles. Figure 11 is a sectional view taken through the rocker bar support. Figure 12 is a plan view of a part of the magazine turret, with a complete magazine assembly secured to one side thereof. Figure 13 is a side view of one of the magazine assemblies. Figure 14 is a sectional view taken on the line 14—14 of Figure 13. Figure 15 is an end view of one of the type-supporting ledge portions of a type magazine. Figure 16 is a longitudinal sectional view taken through one of the magazine plates. Figure 17 is a sectional view taken on the line 17—17 of Figure 12. Figure 18 is a vertical sectional view taken through the magazine turret raising and lowering means.

Figure 20:
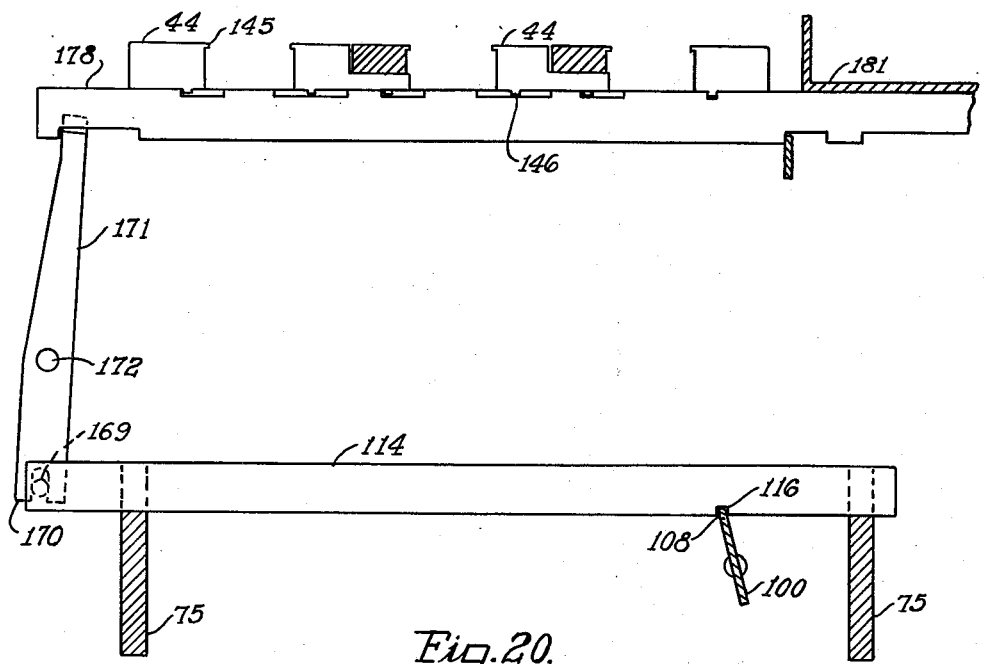
Figure 21:
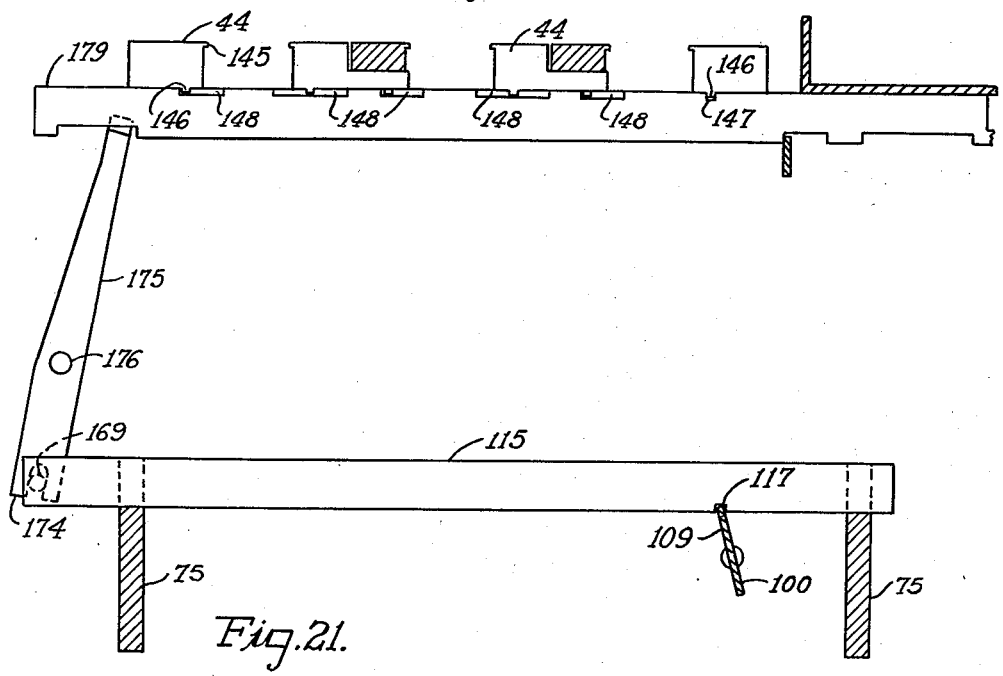

Figure 19 is a perspective view of a type used in my composing machine. Figure 20 is a diagrammatic sectional view taken through the mechanism for shifting the shuttles that discharge lower case type from one side of the magazines. Figure 21 is a diagrammatic sectional view through the mechanism for shifting the shuttles that discharge upper case type from the same side of the magazines as in Figure 20. Figure 22 is a longitudinal sectional view taken through the mechanism for lowering a side rail adjacent one of the conveying belts. Figure 23 is a sectional view taken through the side rail lowering mechanism, showing how it is connected to the key bars. Figure 24 is a cross-sectional view taken through some of the shuttle bars on both sides of the machine, and showing their respective operating levers. Figure 25 is a sectional view taken through the type ejector. Figure 26 is a top plan view of the timing mechanism and the ejector.

Figure 32:
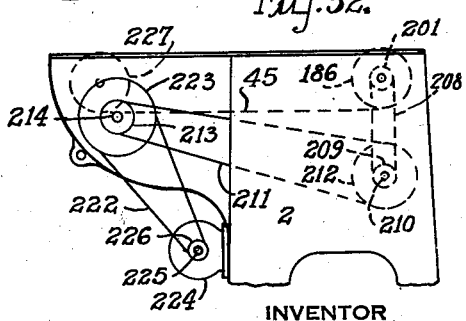

Figure 27 is a sectional view taken through the same on the line 27—27 of Figure 26. Figure 28 is a sectional view taken through the timing device on the line 28—28 of Figure 26. Figure 29 is a perspective view of an inner side of the ejector casing, showing the ejector segment and associated parts. Figure 30 is a perspective view of the ejector segment. Figure 31 is a front view of the ejector casing. And Figure 32 is a rear side view of the machine, showing the driving means for the conveyor belts and the ejector.

Referring to the accompanying drawings for a detailed description of the forms of embodiment of my invention illustrated therein, the numeral 1 designates the body or frame of a machine. In the present instance this frame 1 comprises an elongated, hollow metal bed 2 mounted on four legs 3. This bed, which has a forwardly-projecting, ejector-carrying portion 5, may be made, with the legs, in a single casting. Extending from the front side portion of the bed 2 is an apron 6 upon which a keyboard 7 is mounted.

Secured to the rear open portion of the hollow bed 2 is a plate 8 having top and bottom flanges 9, 9 that carry at their front middle portions a vertical bearing 10 for a hollow turret shaft 11. (See Figures 1, 2 and 18.) Mounted on this shaft for a rotatable movement about it is a turret type magazine 12. This magazine comprises a central frame 13 constructed of cast iron or other suitable metal, with four open sides 14.

At the bottom of the frame 13 is a cylindrical bearing 15 to receive the turret shaft 11. A similar, but longer bearing 16, is at the center of a plurality of radial arms 17 at the top of said frame to receive the top of the turret shaft. Secured to the bearing 16, above the radial arms 17, is a thrust cap 18 to receive the upward thrust of an elevating rod 19 that is vertically movable within the shaft 11. (See Figures 12 and 18.)

Bolted to one side of the central turret frame 13 are right and left type magazine supporting frames 20 and 21 respectively. Similar magazine supporting frames may be bolted to the other sides of the central frame 13 to carry magazines for the additional fonts of type desired. These magazine supporting frames 20 and 21 are connected at their front sides by upper and lower tie bars 22. A central locating bar 23 is connected between the middle portion of the lower tie bar 22 and the opposite side of the central frame 13. (See Figure 12.)

Projecting from the top flange 24 of each magazine-supporting frame is a plurality of locating pins 25, in the present instance three. Projecting inwardly from the bottom flange 26 of each supporting frame, in the same vertical planes as the pins 25, is an equal number of locating pins 27. Opposite each locating pin 27, the central locating bar 23 is formed with a slot 28 to receive the lower inner end portion of a dual channel type magazine plate 29. This plate carries at its outer top portion an ear 30 formed with a hole 31 to receive one of the locating pins 25. At its lower outer side the type magazine plate rests against a respective lateral locating pin 27. When not in use, the type magazines are supported by the top locating pins 25, with their lower ends properly located between the lateral pins 27 and the central bar 23. (See Figures 12, 13 and 17.)

Each type magazine plate 29 has its two side faces formed to provide uniformly spaced longitudinal ribs 33 which extend from the top to the bottom of the plate. The longitudinal ribs 33 fit into the side grooves of short type 34 which are held sidewise in those channels by metal ribs 35 that are vertically alined with the integral ribs 33 on the plate. The ribs 35 have slotted portions which are fitted in slots in transverse retaining bars 28 to which they are welded, soldered or brazed. (See Figures 14 and 16.) These bars 38 are attached at their ends to the margins of the magazine plate 29.

Secured to the lower ends of the ribs 35 are transverse bars 40 similar to the bars 38. Each bar 40 is formed with serrations 41 in which the lower ends of the ribs 35 terminate. The intermediate portion of the serrated edges of each bar 40 is formed inwardly to provide L-shaped ledges 42 upon which the type rest. Between these ledges are slots 43 through which the ends of shuttles 44, hereinafter to be described, are movable to eject the type which lie upon the ledges in sidewise positions. (See Figures 14, 15 and 16.)

The magazine plate 29 is formed at its lower end with a transverse slot 43$^a$ between the L-shaped ledges 42 on both sides of the magazine. This slot, which forms a tunnel over a conveyor belt 45 to be hereinafter described, receives the type which are ejected sidewise from the ledges by the shuttles 44. (See Figure 14.)

For the purpose of raising the magazine turret, so that it may be swung around the shaft 11 to properly position its type magazines 29 upon a shuttle case 46, I have provided the elevating rod 19. This rod is longitudinally movable through the shaft 11 into engagement with the thrust cap 18 on top of the central frame 13 of the turret. Carried by the lower end of the rod 19 is a roller 47 in engagement with the periphery of a disc cam 48 on a transverse shaft 49 suitably journaled in the bed 2 and having attached to its outer end a crank 50 by which the rod may be raised or lowered to elevate and lower the magazine turret. (See Figure 18.)

The shuttle case 46 over which the type magazines are placed by the turret, is preferably a rectangular metal block formed in its top surface with a straight groove 51, and two side grooves 52 and 53 which incline from rear to front toward the middle groove 51. These grooves provide channels for the central conveyor belt 45 and two side conveyor belts 54 and 55 respectively. (See Figures 2, 3, 4 and 5.) The magazine plates 29 rest in these channels, and are located by them to bring the type-receiving slots 43a directly opposite the belts so that the type will be forced sidewise upon them by the shuttles 44. Shuttle covers 56 are attached by screws 57 to the top of the shuttle case 46 at the sides of the belt grooves, over the shuttles 44 to be hereinafter described. For the purpose of locating the type magazines 29 in correct positions over the conveyor belts, locating plates 58 are attached to the tops of the shuttle covers 56 by screws 59. These plates 58 have ears which project over the belt slots 51, to properly locate the type magazines over their respective belts.

The shuttle case 46 is mounted upon a support 60 which rests on a frame 61 that in turn is mounted on a key-bar frame 62 which is secured at one end to the bed 2 by pins 63 and at its other end to the end plate 8 by a bar 64. (See Figures 2 and 3.)

There are two shuttles 44 for each character key 65 in the keyboard 7, one shuttle for the upper case character on its respective key and the other shuttle for the lower case character represented by that key. At its lower end the stem 66 of each key 65 rests upon one end 67 of a bell crank lever 68 pivotally mounted on a rod 69 that is supported in slots 70 in the side members 71 of an intermediate frame 72. This intermediate frame 72, which supports the keyboard 7, is in turn mounted upon the front end of the key-bar frame 62. (See Figure 3.) The keyboard 7 straddles the intermediate frame 72, and carries screws 73 which pass through tapped holes in the top flanges of angle plates 74 that are welded or otherwise secured to the interior surface of the key-bar frame 62. (See Figure 7.)

Welded or otherwise secured to the sides of the key-bar frame 62 are two intermediate transverse re-inforcing members 75. To the front member 75 and the frame 61, there are secured slotted plates 76 and 76a respectively, between which key bars 77 are longitudinally movable. To the rear member 75 there are secured slotted plates 76b and 76c between which the key bars 77 are also longitudinally movable. (See Figures 5 and 6.) These key bars, which are also longitudinally movable through slots in the front end wall of the frame 62, have attached to their rear ends tension springs 78. These springs are secured to a transverse anchor bar 79 mounted in the offset rear end of the key-bar frame.

The lower ends of the bell crank levers 68 are forked to straddle studs 80 on the key bars 77. There is one of these key-bars for each key 65, so that when a key is depressed, its respective key bar will be moved outwardly against the tension of its spring 78, by its respective bell crank lever 68 for a dual purpose soon to be described.

Normally in vertical positions at the sides of the conveyor belts 45, 54 and 55 are side rails 81 which define with them, type receiving channels below the magazines 29. Before a type can be discharged from a slot 43a in a magazine by a respective shuttle 44, the rail 81 on that side of the belt which is to receive that type, must be lowered.

The following mechanism is connected between the side rails and the key bars, whereby, when a key 65 is depressed, a respective side bar will be lowered sufficiently to permit the type corresponding to that key to be discharged over it onto the conveying belt.

Referring to Figure 23, each key bar 77 carries a stud 82 adapted to engage a projection 83 on a rocker bar 84. There is one rocker bar for a plurality of key bars 77, in this instance eight, which pass over the rocker bar. Each rocker bar 84 pivots in the bottom of a V-groove 85 in a block 86 that is secured to the sides of the key-bar frame 62.

Integral with one end of each rocker bar 84 is an ear 86a to which there is pivoted a link 87 attached by a stud 87a to one end of a bell crank lever 88 pivoted on a stud 89 on the shuttle case support 60. (See Figures 22 and 23). The other end of the bell crank lever 88 is pivotally connected to one end of a twisted link 90. The other end of this link is pivotally secured by a pivot 90a to one end of a bell crank lever 91 pivotally mounted on a rod 92 that rests in a transverse groove in the top of the shuttle case support 60. The other end of the bell crank lever 91 is pivotally connected by a short link 95 to the outer end of one of the side rails 81. (See Figure 22.)

There are in the present instance six side rails 81, one on each side of a conveyor belt, and operated by the key bars 77 through the mechanism just described. Each side rail 81 has formed in each end thereof an inclined cam slot 95a. Projecting through each of these slots is a transverse supporting rod 96. These rods 96, 96 are mounted at their ends in slots in the ends of the shuttle case 46. Attached to the inner ends of the side rails 81 are tension springs 97 which are secured at their free ends to an anchor angle plate 98 carried by the inner end of the shuttle case support 60.

When a side rail 81 is drawn outwardly by its respective link 95, the walls of its cam slots 95a, 95a will be engaged by its supporting rods 96, 96 respectively, to move the rail downwardly to the level of the conveying belt, so that a type may be discharged over it onto the belt by a shuttle 44. After the depressed key 65 corresponding to that shuttle is released, the spring 97 will return the side rail to its normal upper position to confine the type on the conveying belt.

Since in the present instance there are eight projections 83 on each rocker bar 84, the latter is adapted to be actuated by any one of eight key bars 77 to lower a respective side rail 81 when the pin 82 thereon engages a respective projection 83 on the rocker bar.

The shuttles 44 are also actuated by the key bars 77, but only after the side rail 81 opposite the type to be discharged is lowered. The connections between the shuttles and the key bars will now be described. Fitted in slots in the top portions of the intermediate members 75, 75 are the undercut end projections 99, 99 of the rectangular rocker-bar supporting frame 61. (See Figure 6.) Disposed between the sides of the frame 61 below the key bars 77, which pass through the frame, is a plurality of longitudinally spaced rocker bars 100. (See Figures 3, 4 and 5.) In the present instance there are twenty-four of these rocker bars.

Welded or otherwise secured to the ends of each rocker bar 100 is the slotted end of a cylindrical pivot bearing 101. (See Figure 11.) The outer end of each pivot bearing 101 is formed with an axial hole to receive the reduced end 102 of a cylindrical bearing support 103 that is fitted in a hole in the side of the frame 61. The head 104 of each bearing support 103 is formed with a groove 105 into which a retaining plate 106 secured to the frame 61 projects.

On the top of each rocker bar 100 are three projections 107, 108 and 109. (See Figures 4, 20 and 21.) The projection 107 enters a slot 110 in the lower edge of its respective key bar 77. This slot is elongated to permit the side rail 81 actuated by this key bar to be lowered before its rocker bar 100 is actuated. In other words, the slot is long enough to permit the projection 107 on the rocker bar to rest therein until the side rail descends to its lowermost position.

The rocker bars 100 operate the shuttles 44 on the front sides of the type magazines 29, through mechanism to be hereinafter described. For the purpose of actuating the shuttles on the opposite or rear sides of the magazines I have provided a similar number of rocker bars 111. The latter are located in a horizontal row above the key bars 77. Each rocker bar 111 is constructed similarly to the rocker bars 100, having secured to its outer ends pivot bearings 101 which turn on the reduced ends 102 of cylindrical bearing supports 103 carried by the frame 61 and retained therein by plates 106. Each rocker bar 111 has formed on its lower edge a projection 112 which is received by an elongated slot 113 in the upper margin of its respective key bar 77, for actuation by the latter after the proper side rail 81 has been lowered by it. (See Figure 4.)

Disposed between the key bars 77 within the space defined by the walls of the shuttle case support 60, is a plurality of shuttle-lever operating bars 114 and 115 that project between the slotted plates 76, 76ᵃ, 76ᵇ, and 76ᶜ. A shuttle-lever operating bar 114 and a shuttle-lever operating bar 115 is adapted to be actuated by each key bar 77 that is employed to discharge type from one side of magazines. (See Figures 20 and 21.) Each shuttle-lever operating bar 114 is formed in its lower edge with a short slot 116 that receives the projection 108 on the rocker bar 100 actuated by its respective key bar 77. A similar slot 117 is formed in the lower edge of each shuttle-lever operating bar 115 to receive the projections 109 on the same rocker bar. Therefore, when the latter is rocked by its respective key bar 77 in response to a depression of its key 65, it will draw the two shuttle-lever operating bars 114 and 115 belonging to it, outwardly.

Longitudinally movable through a slotted plate 117ᵃ secured to the front wall of the shuttle case support 60, is a plurality of shuttle-lever operating bars 118 and 119 which are movable at their rear ends through slotted plates 117ᵇ and 117ᶜ secured to the shuttle case support 60 and the frame 61 respectively. There is a shuttle-lever operating bar 118 and a shuttle-lever operating bar 119 for each rocker bar 111. (See Figures 4, 5 and 24). Formed in the lower edge of each shuttle-lever operating bar 118 is a short slot 120 which is engaged by a projection 121 on its respective rocker bar 111. A similar slot is formed in the lower edge of the shuttle-lever operating bar 119 for engagement by another projection on that rocker bar. Therefore, when a rocker bar 111 is rocked by the outward movement of a respective key bar 77, in response to a depression of its key 65, the two shuttle-lever operating bars 118 and 119 will be forced inwardly by that rocker bar, or in a direction opposite to the shuttle-lever operating bars 114 and 115, when their respective key bars 77 are moved outwardly by their depressed keys 65.

Carried by the outer end of each of the shuttle-lever operating bars 118 and 119 is a horizontal pin 124. (See Figures 4, 5 and 24.) The pin 124 on each bar 118 fits in the forked end 125 of a shuttle lever 126 pivotally mounted on a cross shaft 127 carried by an oscillating block 128. The pin 124 on each shuttle-lever operating bar 119 engages the forked end 129 of a shuttle lever 130 mounted on a cross shaft 131 carried by an oscillating block 132. The oscillating block 128 is pivotally secured to the shuttle case support 60 by pins 133 and 134 at the sides of the block. The pin 134 also acts as a pivot for the inner side of the oscillating block 132, the outer side of said block being pivotally secured to the shuttle case support by a pin 135. (See Figure 24.)

The shuttle levers 126 and 130 belonging to a respective key bar 77, project upwardly at an acute angle to each other in parallel vertical planes. The upper end of the lever 126 enters an elongated slot 136 in a shuttle bar 137, while the companion lever 130 enters a similar elongated slot in a shuttle bar 139 on the opposite side of the machine. The shuttle bars 137 and 139 are mounted for longitudinal movement in grooves in the top of the shuttle case 46. Attached to the free ends of these shuttle bars are tension springs 141 which are secured at their outer ends to an overhanging anchor plate 142 attached to the shuttle case 46.

Each end shuttle 44 comprises a metal block having a forwardly projecting tongue 145 which enters the slot in the adjacent ledge 42 of a respective magazine 29 to eject type therefrom onto the conveyor belt when the shuttle is moved by its respective shuttle bar. (See Figure 10.) The middle shuttles 44 are formed with tail portions 44ᵃ which project under the main body portions of their companion shuttle to make them interlocking. (See Figure 9.)

For the purpose of connecting the shuttles 44 to their respective shuttle bars, so that when one shuttle is moved by its respective bar the other shuttles belonging to the group of shuttle bars including that particular shuttle bar will remain at rest, I have provided the following means. Formed on the bottom of each shuttle 44 is a key 146 that extends across the bottom of the end shuttles for entrance into slots in the top edges of the shuttle bars 137 and 139. Each shuttle bar is formed with a series of these slots—a narrow slot 147 which snugly receives the key 146 on a respective shuttle 44, and five additional slots 148 which are elongated to permit the keys 146 on the remaining five shuttles 44 in line with the first shuttle, to remain at rest in these slots during the time the first shuttle is being moved by its respective shuttle bar to eject a type.

In the present instance there are three sets of eight shuttles each that are moved outwardly in the same direction by respective shuttle bars to eject lower case type from the three left magazines 29. Each one of these shuttles is connected to its respective shuttle bar by the means before described. The shuttle bars that actuate these lower case shuttles, are themselves operated by the engagement of the levers 126 in the elongated slots 136 within them. The shuttle bars that contain the elongated slots 138 for engagement by the levers 130 are the ones which actuate the three sets of eight shuttles each for the upper case type contained in the three right magazines 29. Each shuttle lever is formed at its upper end with two parallel ears 149, 149 which straddle its respective shuttle bar to hold the top of the lever in the elongated slot in the front lower edge of the bar.

When a shuttle lever 126 is in position for engagement with the outer edge of the elongated slot 136 in its respective lower case shuttle bar 137, its companion lever 130 on the other side of the machine will be at the inner end of the slot 138 in its respective upper case shuttle bar 139, so that when the upper end of the lever 126 moves outwardly to force its respective shuttle bar in that direction, the lever 130 will travel through its slot 138 without moving its respective shuttle bar containing that slot. It is thus seen that when the shuttle bars 137 for the lower case type are in operation, their companion shuttle bars 139 that actuate the upper case type shuttles 44 will be at rest. (See Figures 4 and 5.)

In order to reverse the initial positions of the levers 126 and 130 so that, when a key 65 is depressed, an upper case type will be ejected onto a conveyor belt by an upper case shuttle 44, the following toggle means are provided. Mounted on a transverse shaft 150 that is supported at its ends in the end walls of the shuttle case support 60, is a toggle block 151. Pivotally connected to one end of the toggle block 151 is a link 152 which is pivotally secured at its outer end to the oscillating block 128 which carries the shuttle levers 126. Also pivotally connected to the same end of the toggle block 151 is a link 153 which is pivotally attached at its outer end to the oscillating block 132 which carries the shuttle levers 130. (See Figures 3, 4 and 5.)

For the purpose of rocking the toggle block 151 to change the initial position of the shuttle levers 126 and 130 through the links 151 and 152, there is fixedly secured to the transverse toggle shaft 150 the upper ends of two arms 154, 154, one on each side of the machine. (See Figures 4, 5 and 8.) Secured to one of these arms is a tension spring 155 whose other end is attached to an anchor pin 156 secured to the shuttle case support 60.

The lower ends of the arms 154, 154 are held by the tension spring 155 in engagement with pins 157, 157 carried by shift bars 158, 158 respectively. (See Figure 8.) There is one of these bars on each side of the machine, being mounted, like the key bars 77, for longitudinal movement through the front end wall of the key-bar frame 62.

At its outer end each shift bar 158 carries a pin 159 which is straddled by the forked end 160 of a bell crank 161 mounted on one of the rods 69. Resting upon the upper free end of each bell crank 161 is the stem 163 of a shift key 164. There is one of these keys on each side of the keyboard 7, and when either one of them is depressed, it will actuate the before described mechanism to throw the right end of the toggle block 151 upwardly to set the shuttle levers 130 in positions to actuate the shuttle bars 44 on the right side of the machine for the purpose of discharging upper case type onto a conveying belt, while the lower case shuttles 44 remain at rest. When the depressed shift key 164 is released, the spring 155 will draw its arm 154 rearwardly to restore the toggle block 151 to its lower case lever-setting position.

Mounted on the front lower portion of the keyboard 7 is a space bar 165 that is carried by stems 166, one of which rests upon the upper end of a bell crank 167 mounted on one of the rods 69. The lower end of this bell crank has a forked connection with a pin 168 carried by one of the key bars 77 that in turn actuates a shuttle 44 through the mechanism hereinbefore described, to discharge a spacing slug from one of the type magazines 29 upon a conveyor belt. (See Figure 3.)

Having described the means for operating the three sets of left shuttles 44 for discharging upper and lower case type toward the operator, the following mechanism is employed for operating a similar number of right shuttles 44 for discharging upper and lower case type from the right magazines.

The shuttle lever operating bars 114 and 115 for each of the remaining key bars 77 carry horizontal pins 169. (See Figures 4, 5, 20 and 21.) The pin 169 on each bar 114 fits in the forked end 170 of a shuttle lever 171 pivotally mounted on a cross shaft 172 carried by an oscillating block 173. The pin 169 on each shuttle lever operating bar 115 engages the forked end 174 of a shuttle lever 175 pivotally mounted on a cross shaft 176 carried by an oscillating block 177. The oscillating blocks 173 and 177 are pivotally secured to the shuttle case support 60 by pins 177ª similarly to the oscillating blocks 128 and 132.

The shuttle levers 171 and 175 project upwardly similarly to the shuttle levers 126 and 130, for entrance into elongated slots in shuttle bars 178 and 179 respectively on opposite sides of the machine. These shuttle bars, like the shuttle bars 137 and 139, are mounted for longitudinal movement in grooves in the top of the shuttle case 46. Attached to the free ends of the shuttle bars 178 and 179 are tension springs 180 which are secured at their outer ends to an overhanging anchor plate 181 attached to the shuttle case 46.

For the purpose of connecting the right shuttles 44 to the shuttle bars 178 and 179, so that when one shuttle is moved by its respective bar, the other shuttles belonging to the group of shuttle bars including this particular shuttle bar, will remain at rest, I have provided the following means: Formed on the bottom of each right shuttle is one of the keys 146, for entrance into slots in the top edges of the shuttle bars 178 and 179. These slots are similar to the slots in the upper edges of the shuttle bars 137 and 139, whereby, when one shuttle is moved by its respective bar to eject a type, the remaining shuttles of its group will remain at rest.

The shuttle bars 178 that actuate the lower case shuttles, are themselves operated by the engagement of the levers 171 in the elongated slots in their lower edges, while the shuttle bars 179 for the upper case type are shifted by the engagement of the levers 175 in the elongated slots in their lower edges. However, as in the case of the shuttle levers 126, when a shuttle lever 171 is in position for engagement with the outer edge of the elongated slot in its respective shuttle bar 178, the companion shuttle lever 175 on the other side of the machine will be at the inner end of the slot in its respective upper case shuttle bar 179, so that when the upper end of the shuttle lever 171 moves outwardly to force its respective shuttle bar in that direction, the lever 175 will travel through its slot without moving its respective shuttle bar containing that slot. Accordingly, when the shuttle bars 178 for the lower case type are in operation, their companion shuttle bars 179 that actuate the upper case type shuttles will remain at rest.

In order to reverse the initial positions of the shuttle levers 171 and 175, the same toggle block 151 is employed. Pivotally connected to the inner end of this block is a link 183 which is also pivotally connected to the oscillating block 173 which carries the shuttle levers 171. Also pivotally connected to the same end of the toggle block 151 is a link 184 that is pivotally secured to the oscillating block 177 which carries the shuttle levers 175. Through this link connection with the toggle block 151, the initial positions of the shuttle levers 171 and 175 may be reversed for the discharge of upper case type from the right magazines by the operation of a shift key 164, in the same manner that the initial positions of the shuttle levers 126 and 130 are changed by the operation of one of these shift keys.

The conveyor belts 45, 54 and 55, which convey the type discharged upon them by the magazine 29 to an ejector to be hereinafter described, pass over pulleys 185, 186 and 187 respectively in the rear portion of the bed 2. (See Figure 2.) Since the type lies flat upon these belts, the machine will accommodate type having both narrow and wide bodies, and of a two-point set-wise size up to and including fourteen point set-wise size. For the same reason, it will also take care of type from eight-point body size up to and including twelve-point body size. The pulley 185 is secured to a shaft 188 journaled in bearings 189, 189 mounted on a plate 190. Projecting outwardly from two sides of this plate are pins 191 and 192 which fit in supporting bosses 193 and 194 respectively on the wall of the bed 2.

The pulley 186 over which the belt 54 passes, is secured to a shaft 195 journaled in a bearing 196 mounted on the plate 190. A pin 197 projects inwardly from this bearing 196 for engagement with a side wall of the key-bar frame 62 to assist in firmly anchoring the bearing plate 190 within the bed 2. The pulley 187 carrying the belt 55, is secured to a shaft 198 journaled in a bearing 199 mounted on the plate 190, and has a projecting pin 200 that engages the same side wall of the key-bar frame 62 as the pin 197, to assist the latter and the pins 191 and 192 in anchoring the bearing plate within the bed. (See Figure 2.)

The shaft 195 carrying the pulley 186 has secured to its outer end a driving pulley 201 driven by means hereinafter to be described. The pulley 186 is attached to an inner disc 202 integral with the shaft 195 by which it is driven to move the endless conveyor belt 54. In the inner face of the disc 202 there is a diametric slot which receives a diametric pin 204 carried by the shaft 188 to which the middle pulley 185 is attached. Through this slot and pin connection the shaft 188 which is at an angle to the shaft 195, is driven by the latter to rotate the pulley 185 and the conveyor belt 45 which passes over it. (See Figure 2.)

The other end of the shaft 188 also carries a drive pin 205 similar to the pin 204, for entrance into a diametric slot in the inner face of a disc 207 integral with the shaft 198 that carries the pulley 187. The latter pulley is attached to this disc 207 so that the conveyor belt 55 may be driven through the slot and pin connection between the shaft 198 and the shaft 188 which is at an angle to it.

The belt pulleys 185, 186 and 187 are driven in unison from the pulley 201 by a belt 208 that passes around it and a pulley 209 secured to a countershaft 210 mounted in the bed 2. (See Figure 32.) The pulley 209 is in turn driven by a belt 211 which passes around a pulley 212 on the countershaft 210 and a pulley 213 secured to a main drive shaft 214. This shaft is journaled in bearings 215 and 216 mounted on a bearing plate 217 in the front portion 5 of the bed 2, by means of pins 218 and 219 that project from said bearing plate into bosses 220 and 221 respectively on the wall of the bed. Through a belt 222 passing over a pulley 223 secured to the shaft 214, the latter is driven by a motor 224 attached to the bed 2, and whose armature shaft 225 carries a pulley 226 around which the belt 222 passes. (See Figure 32.)

The middle endless belt 45 travels around a front pulley 227 which rotates on a stationary shaft 228 carried by an adjustable block 229 on the bearing plate 217. At one side of the block 229 there is a vertical lug 230 on the bearing plate. Projecting outwardly from a tapped hole in this lug is a horizontal adjusting screw 231 which engages the block 229 to move it to an adjusted position to take up the slack in the belt 45. It is held in this position by a vertical screw 232 which projects through a flange 233 on the block, into engagement with the top surface of the bearing plate 217. (See Figure 2.)

Immediately behind, and at a slight angle to, the pulley 227, a pulley 234 for the front portion of the endless belt 54 is mounted for rotation on a shaft 235 carried by an adjustable block 236 on the bearing plate 217. The means for adjusting this block to take up the slack in the belt 54 are similar to the means employed for adjusting the block 229 carrying the pulley shaft 228.

Just behind, and at an acute angle to, the pulley 234 a pulley 237 for the front portion of the endless belt 55 is rotatably secured to a shaft 238 carried by a block 239 adjustably mounted on the bearing plate 217 in the same manner as the block 229.

The conveyor belt 45 passes over the middle portion of a supporting plate 240 into a longitudinal slot 241 in the front end of said plate. This slot permits the belt 45 to descend below the level of the belts 54 and 55 which approach it at acute angles while traveling upon said plate.

The type carried by the side belts 54 and 55 will be deposited upon the belt 45 at the points where these belts meet that belt over their respective pulleys 234 and 237 respectively. A pointed guide member 242 is secured to the supporting plate 240 between the belts 45 and 54, while a similar guide member 243 is attached to that plate between the belts 45 and 55. Guide members 244 and 245 are secured to said plate adjacent the outer edges of the belts 54 and 55. These guide members 242, 243, 244 and 245, which abut the ends of the shuttle covers 56, define channels that direct the type on the side belts 54 and 55 onto the middle belt 45 which conveys this type, together with the type which is discharged upon it, by the shuttles 44 to an ejector soon to be described.

At the sides of the guide members 244 and 245 cover plates 246 and 247 respectively are mounted on the bed 2. Flush with the outer ends of the guide member 244 and the cover plate 246 is a combination cover plate and guide 248 that is secured on the top of the front portion 5 of the bed. Abutting the outer ends of the guide member 245 and the cover plate 248 is the horizontal flange portion of a combination cover plate and guide 249 which is also secured to the front portion 5 of the bed. The adjacent edges of the cover plates 247 and 249 are formed straight at the sides of the belt 45 to provide a continuation 250 of the channel 251 which the front ends of the guide members 244 and 245 form together at the sides of the belt 45 beyond the pointed guide members 242 and 243.

At the point where the belt 45 leaves the channel 250 in passing over the pulley 227, the spaced inner edges of the cover plates 248 and 249 curve to the right and then follow a straight path to the outer side edge of the bed 2 to provide a channel 252 which conducts the type to the ejector. Those parts of the cover plates 248 and 249 which define this channel 252, slope downwardly to assist in placing the type in proper positions for ejection. (See Figure 2.)

Rotatably mounted on an inclined stationary shaft 253 secured to the bearing plate 217, is a disc 254. The face of this disc forms the bottom of the channel 252 that carries the type to the ejector. Referring to Figures 25 and 27, a sleeve 255 projects downwardly from the center of this disc 254, over the shaft 253. Formed on the lower end of this sleeve 255 are segmental projections 256 which enter a diametric slot 257 in the upper face of a worm gear 258 that is rotatable in the shaft 253 and rests upon a boss 259 on the bearing plate 217.

The worm gear 258 is in mesh with a worm 259a secured to a shaft 260 which is journaled for rotation in bearings 261 and 262 mounted on the bearing plate 217. (See Figures 2, 25 and 27). Also secured to the shaft 260 is a helical gear 263 which is in mesh with another helical gear 264 mounted on the main drive shaft 214. Therefore, when this shaft is rotated by the motor 224, the disc 254 will be rotated to force the type deposited upon it by the belt 45, through the channel 252 to the timer, now to be described.

Referring to Figures 26, 27 and 28, a plurality of grooves, in this instance three, are formed in the top surface of the lower portion of the cover plate 249, at right angles to, and communicating with, the channel 252. Contained within these grooves are three timing fingers 266, 267 and 268 having beveled outer ends which are adapted to project into the channel 252 to momentarily intercept the passage of type therethrough for timing purposes. Each timing finger carries a pin 269 to which there is attached one end of a tension spring 270 whose outer end is secured to an anchor rod 271 attached to the side members 272, 272 of a top frame 273. This frame is removably attached to the cover plate 249 by screws 274 which pass into tapped holes in the latter through the side member 272, and by a screw 275 which enters a tapped hole in the cover plate through an ear 276 on the upper left portion of the frame. (See Figure 26).

The outward movement of each timing finger is limited by an adjusting rod 277 which passes through a tapped hole in a lug 278 on the frame 273, and a hole in the rear end of the latter. Each adjusting rod 277 projects beyond the rear end of the frame for engagement by a pin 279 carried by the rear end of a respective timing finger to define the distance which the beveled front end of the latter projects into the channel 252.

The timing fingers 266, 267 and 268 are drawn inwardly by the following means to clear the channel 252 for the passage of type therethrough. Pivotally mounted on a stud 280 carried by a boss 281 on the upper right corner portion of the top frame 273, is a cam lever 282. The lower end of this cam lever is positioned to engage and move inwardly a pin 283 on the middle timing finger 267 when the upper end of said lever is engaged by a lobe 284 on a disc cam 285 secured to the top face of the disc 254 for rotation by the latter. (See Figures 26 and 27.) This disc cam is adjustably secured to the disc 254 by screws 286 and 287 which project from its top face through arcuate slots 288 and 289 respectively in the cam. The latter has a large axial hole that surrounds a washer 290 secured to the top end of the shaft 253 by a screw 291 to hold the disc 254 thereon. (See Figures 26 and 27.)

The disc cam 285 is formed in the present instance with ten peripheral lobes 284. These lobes also engage the inner end of a cam lever 292 pivotally secured by a stud 293 carried by a lug 294 on the upper left corner portion of the top frame 273. When this cam lever 292 is engaged by one of the lobes 284 on the disc cam 285, its lower end will contact pins 295 and 296 on the timing fingers 266 and 268 respectively to draw their outer beveled ends out of the channel 252. The cam levers 282 and 292 are normally maintained in engagement with the lobed periphery of the disc cam 285 by a tension spring 297 connected between studs 298 and 299 respectively on said levers. (See Figure 26.)

When the disc 254 is rotated to carry a type downwardly through the channel 252, that type will be first intercepted by the beveled end of the timing finger 266. This finger will restrain the descent of that type through the channel until it is drawn inwardly by its respective cam lever 292 that is actuated as heretofore described by the cam 285 attached to the disc 254. The inward movement of the first finger 266 is timed to begin after the second timing finger 267 is in position within the channel 252 to intercept the passage therethrough of the type to be released by the first finger. The second finger 267 will then hold the type until it is withdrawn from the channel 252 by its respective cam lever 282 actuated by the same disc cam 285. When this occurs, the spring 270 attached to the first finger 266 and the third finger 268 will draw them outwardly to project their beveled ends in unison into the channel 252. The third finger 268 then intercepts the type released by the second finger 267 while the type immediately above it drops upon the first finger 266. Then when the first and third fingers are drawn inwardly by their respective cam lever 292, the upper type will drop upon the second finger 267 now drawn into the channel by its spring 270, and the lower type will descend into an ejector pocket soon to be described. It is thus seen that my timing mechanism releases one type at a time into this pocket. Three timing fingers are provided so that if a type should miss the first finger 266, it will be intercepted by either the second finger 267 or the third finger 268 for proper release thereby into the ejector pocket.

Referring to Figures 2, 25, 27 and 31, there is secured to the upper front left corner part of the projecting portion 5 of the bed 2, an ejector case 300. In the present instance this case comprises two spaced plates 301 and 302. The right plate 301 has a right angle flange 303 that is attached to the wall of the bed by screws 304, 304. The left plate 302 also has a right angled flange 305 that is secured to the wall of the bed 2 by screws 306, 306.

The abutting inner face portions of the plates 301 and 302 are machined to form between them a type receiving channel 307 that inclines upwardly to meet the channel 252. (See Figure 31.)

Projecting from these plates into the front part of this channel 307 are two narrow lugs 308, 308 that guide the type into a registering groove in a suitable chase 309 secured to the bed 2.

Communicating with the rear upper portion of the ejector channel 307 is a narrow, curved slot 310 formed by machining the meeting faces of the plates 301 and 302. Projecting across the middle portion of this slot is a rotatable shaft 311 upon which an ejector segment 312 is mounted. (See Figures 27 and 29.) The segment 312 is formed with a peripheral flange 313 containing a groove 314. This flange on the ejector segment 312 is located a sufficient distance from its hub 315 to pass immediately above the lugs 308, 308 on the housing plates in order to clear them when it approaches the end of its type-ejecting movement. (See Figures 29 and 30.)

The type released by the third timing finger 268 descends through the end of the channel 252 onto the bottom of the rear upper end of the ejector channel 307. Projecting forwardly into the channel at this point is a thin insert 316, secured between the two plates 301 and 302, and having a forwardly projecting tongue 317 that enters the peripheral groove 314 in the ejector segment 312 to close the slot 310 against the entrance of the type that descends into the channel 307 from the channel 252. (See Figure 29.) If this insert were not provided, a type might assume a position in that slot which would prevent its proper ejection over the lugs 308, 308. Carried by a block 318 secured to the cover plate 248 is a flat spring 318a which projects over the channel 252 to prevent type from leaving the top portion of the latter.

The type released by the third timing finger 268 descends to the rear portion of the channel 307 where it rests against two pins 319, 319 that project inwardly from the abutting plates 301 and 302 respectively. In this position the type lies directly in the path of forward movement of the ejector segment 312. (See Figure 29.) This segment then engages the head of the type, and tilts it around the peripheries of the pins 319, 319 into contact with the lugs 308, 308, after which it is forced head first over them by the segment into the groove that receives it in the chase 309.

The ejector segment 312 is reciprocated by the following means to eject type from the channel 307. Referring to Figures 25 and 27, there is secured to the ejector shaft 311 a crank 320 which is pivotally connected to a link 321 that is pivotally secured at its free end to a pin 322 on a crank 323. This eccentric is secured to the worm shaft 260 that is rotated by the motor 224 through the means heretofore described. The reciprocation of the ejector segment 312 is timed with the movement of the type arresting fingers 266, 267 and 268, so that whenever a type is released by the finger 268 it will descend into the channel 307 in sufficient time to be engaged by the forward movement of the ejector segment, by which it is forced head first into the chase 309.

In operation, printer's type as well as any other short type bearing upper and lower case characters are inserted in the magazines 29. Preferably, type carrying the upper case characters are inserted in the magazines on the right side of the machine, and type bearing the lower case characters are placed in the magazines on the left side of the machine. The turret carrying these magazines is then swung over the shuttles 44, and lowered by the crank 50 to a position for ejection of the type by them.

The motor 224 is then turned on by the operator to start the movement of the conveyor belts and the operation of the timing and ejecting mechanism.

If the first sentence of the composition to be set up in the chase 309 is started with a capital letter, or any other upper case character, the operator depresses one of the shift keys 164. Through its bell crank connection with a shift bar 158, this bar will be drawn outwardly to rock the toggle block 151 by means of the arm 154. This block, through its link connection with the shuttle levers, will then place the levers 130 and 175 at the forward ends of their slots in the shuttle bars 139 and 179 respectively on the right side of the machine. (See Figure 5.)

A key 65 displaying the character desired is now depressed by the operator. The key bar 77 corresponding to that key will then be drawn outwardly through its bell crank connection to it. If the type in the magazine corresponding to that key is on the front side of a magazine, or that side facing the operator, the shuttle levers 171 and 175 will be rocked by the shuttle lever operating bars 114 and 115 connected to their respective key bar 77 through a rocker bar 100.

Now, since the shuttle lever 175 just mentioned is in contact with the front end of its slot in a respective shuttle bar 179, it will move this bar away from the operator, to cause the shuttle 44 with which it has a key connection, to eject from the front side of its respective magazine on the right side of the machine, an upper case type corresponding to that key. No lower case type bearing the character displayed by that key will be discharged from the magazine on the other side of the machine, since the shuttle lever 171 will travel idly through its slot in its respective shuttle bar 139 during the type ejecting movement of the lever 175.

If the next character in the word or sentence of the composition being set up is a lower case character, the shift key 164 will remain at rest, since the spring 155 will have restored the toggle block 151 to its normal lower case position. The key 65 corresponding to the next character desired on a lower case type is then depressed. If that type is carried by the rear side of a magazine 29, the shuttle-lever operating bars 118 connected by the rocker bar 111 to the key bar 77 actuated by that key, will be moved away from the operator. The shuttle lever 126 connected to this bar 118 will then be actuated to shift its respective shuttle bar 137 toward the operator, since the upper end of this lever is in the front end of the slot 136 in that shuttle bar. (See Figure 4.) The companion shuttle lever 130 being at the rear end of the slot 138 in its respective upper case shuttle bar 139, will travel through that slot without shifting that bar during the longitudinal movement of the lower case shuttle bar 137. The latter shuttle bar during its outward movement will force its respective shuttle 44 toward the operator to eject from the rear side of a magazine the lower case type corresponding to the key depressed.

When a type is discharged from a magazine 29 by a shuttle 44 corresponding to a depressed key, or a spacing slug is ejected therefrom by the shuttle allocated to the space bar 165, it is forced by the shuttle upon a conveyor belt. Before this occurs, however, the side rail 81 for this belt opposite the magazine containing this type, will be lowered by the hereinbefore described mechanism first operated by the key 65. The type or slug is now free to be discharged over this lowered side rail upon the belt.

If the type or slug is received by the middle belt 45, it is carried directly by it to the channel 252 over the disc 254. When it is discharged upon either one of the side belts 54 or 55, it is delivered by that belt to the middle belt 45 at their point of convergence.

By the disc 254 the type is carried through the channel 252 to the timing fingers 266, 267 and 268, which release it to the channel 307 in the ejector case 300 in front of the ejector segment 312. This segment then engages the type, tilts it over the lugs 308, 308 and forces it head first into the chase 309. In this way the composition is set up in the chase with the greatest ease and efficiency by the operator.

I do not desire to be limited to the details of construction and arrangement herein shown and described, and any changes or alterations may be made herein within the scope of the subjoined claims.

Having described my invention, I claim:

1. In a type composing machine, a type magazine, an ejector, a channel member into which selected type are forced by the ejector, and endless belts which converge at a common point near the ejector for carrying the type in a horizontal position from the magazine to the ejector.

2. In a type composing machine, a type magazine, an ejector, a channel member into which selected type are forced by the ejector, endless belts for carrying the type in a horizontal position from the magazine to the ejector, and discharge channels in said magazine, one on each side of each belt, for discharging type sidewise from the magazine onto said belts.

3. In a type composing machine, a type magazine, an ejector, a channel member into which selected type are forced by the ejector, and a rotating disc between the magazine and the ejector to receive type from the channel and present it to the ejector.

4. In a type composing machine, a magazine, an ejector, a channel member into which the type are forced by the ejector, a horizontal disc between the ejector and the magazine for delivering type to the ejector, a timing device above the disc to enforce the presentation of one type at a time by the disc to the ejector, and means for conveying the type from the magazine to the disc.

5. In a type composing machine, a magazine, an ejector, a channel member into which the type are forced by the ejector, a horizontal disc between the ejector and the magazine for delivering type to the ejector, a plurality of plungers for engagement with the type to permit the presentation of one type at a time by the disc to the ejector, a cam carried by the disc to actuate said plungers in synchronism with the ejector.

6. In a type composing machine, a magazine, an ejector, a channel member into which the type are forced by the ejector, a horizontal disc between the ejector and the magazine for delivering type to the ejector, a plurality of plungers adjacent one face of the disc for engagement with the type to permit the presentation of one type at a time by the disc to the ejector, an adjustable disc cam formed with lobes on its periphery, carried by said disc, cam levers for engagement by the cam lobes to actuate said plungers in synchronism with the ejector, and means for conveying the type from the magazine to the disc.

7. In an ejector for type composing machines, a housing formed with a channel through which a type is free to move, a type ejector in said channel, and means in said channel in front of said ejector to tilt the type when moved against them by the ejector, for discharge head first from the housing.

8. In an ejector for type composing machines, a housing comprising a pair of connected side members formed with a groove through which a type is free to move, a shaft transversely mounted between the side walls, a type ejecting segment secured to said shaft for an oscillatory movement through said groove, a pair of pins projecting into said groove from the side walls for engagement by the lower ends of the type, a pair of lugs projecting from said side walls in front of the pins, and over which the type is forced by the ejector for discharge head first from the housing.

9. In an ejector for type composing machines, a housing comprising a pair of connected side walls formed with a slot through which a type is free to move, a shaft transversely mounted between the side walls, a type-ejecting segment secured at its inner end to said shaft for an oscillatory movement through said slot, a grooved head on said segment to move a type outwardly through said slot, and a stationary tongue projecting into the groove in the head of the segment, from a position between the side walls, behind the type, to prevent the latter from falling rearward into the slot.

10. In a type composing machine, a type magazine, an ejector, a channel member into which the type are forced by the ejector, a shaft between the ejector and the magazine, a horizontal disc rotatable on said shaft, means for conveying type from the magazine to the disc, a plurality of plungers adjacent one face of the disc for engagement with the type to permit the presentation of one type at a time by the disc to the ejector, a cam carried by the disc to actuate said plungers, a second shaft, an ejector mounted on said shaft for forcing the type released by said plungers into said channel member, means on the first shaft for rotating said disc, and an eccentric connection between the disc rotating means and the second shaft to rotate the latter, in timed relation to the cam carried by the disc.

11. In a type composing machine, a type magazine, an ejector, a channel member into which the type are forced by the ejector, a shaft between the ejector and the magazine, a horizontal disc rotatable on said shaft, means for conveying type from the magazine to the disc, a plurality of plungers adjacent one face of the disc for engagement with the type to permit the presentation of one type at a time by the disc to the ejector, a cam carried by the disc to actuate said plungers, an ejector shaft, an ejector mounted on said shaft to force the type released by said plungers into said channel member, a worm shaft, power means for rotating the worm shaft, a worm secured to the worm shaft, a worm gear loosely mounted on the first shaft in mesh with said worm, a sleeve projecting downwardly from said disc, over the first shaft, into locking engagement with said worm gear, for rotation by the latter to rotate the disc, a crank on the worm shaft, an arm secured to the ejector shaft, and a link connection between the eccentric and said arm to rotate the ejector shaft in timed relation to the cam carried by the disc.

12. In a type composing machine, a type magazine, an ejector, a channel member into which selected type are forced by the ejector, an endless belt whose upper run travels horizontally between said magazine and the ejector, an endless belt on each side of the first belt, key-operated means for ejecting type from the magazine onto the upper runs of said belts, and means for converging the side belts with the first belt, to discharge type from said side belts onto the first belt, which carries said type and the type deposited upon it to the ejector.

13. In a type composing machine, a type magazine, a channel, an ejector for discharging type from said magazine horizontally into said channel, a vertically movable side rail for said channel, key-operated means for operating said ejector, and means co-ordinated with said key-operated means for lowering the side rail to permit the ejector to discharge a type over it from the magazine into the channel.

14. In a type composing machine, a type magazine, an ejector, a channel member into which selected type are forced by the ejector, an endless belt whose upper run travels between said magazine and the ejector to carry type to the latter from the magazine, vertically movable side rails for the upper run of said belt to form a horizontal type channel therewith, key-operated means for forcing type from said magazine onto said belt, and means co-ordinated with the key-operated means for lowering one of said rails to permit type to be ejected over it onto said belt.

15. In a type composing machine, a type magazine, an ejector, a channel member into which selected type are forced by the ejector, an endless belt whose upper run travels between said magazine and the ejector to carry type from the latter to the magazine, vertically movable side rails for the upper run of said belt to form a horizontal type channel therewith, key-operated means for forcing type from each side of said magazine onto said belt, and means coordinated with the key-operated means for lowering the side rail on the side from which type is ejected onto said belt.

16. In a type composing machine, a type magazine, an ejector, a channel member into which selected type are forced by the ejector, an endless belt whose upper run travels between said magazine and the ejector to carry type to the latter from the magazine, side rails movable in inclined planes, for the upper run of said belt to form a horizontal type channel therewith when in their raised positions, key-operated means for ejecting type from each side of said magazine onto said belt, and cam means co-ordinated with the key-operated means for lowering the side rail on the side from which type is ejected onto said belt.

17. In a type composing machine, a type magazine, an ejector, a channel member into which type are forced by the ejector, an endless belt whose upper run travels between said magazine and the ejector to carry type to the latter from the magazine, side rails for the upper run of said belt to form therewith a horizontal type channel, said side rails formed with cam slots in their end portions, stationary pins projecting through said slots, springs attached to one end of said side rails to hold them in their upper positions, and link means attached to the other end of said side rails and co-ordinated with the key-operated means, to pull said rails longitudinally over said pins, whereupon they will be lowered to permit the type ejected from said magazine to clear them during said ejection.

18. In a type composing machine, a type magazine, an ejector, a channel member into which selected type are forced by the ejector, an endless belt whose upper run travels horizontally between said magazine and the ejector, an endless belt on each side of the first belt, key-operated means for ejecting type from the magazine onto the upper runs of said belts, the side belts converging with the first belt at a point near the ejector, means for rotating said belts and actuating the ejector, and means for diverting type from the side belts onto the first belt at their point of convergence.

19. In a type composing machine, a type magazine, a type channel adjacent the discharge end of the magazine, a plurality of horizontally movable type-engaging members to force type sidewise from each side of the magazine into said channel, a plurality of depressible keys, one for each type-engaging member, vertically movable side rails for said type channel, a connection between each key and its type-engaging member to force a type corresponding to said key, horizontally from the discharge end of the magazine into the type channel, and means co-ordinated with said keys for lowering a rail on the side of the channel from which type is forced into it from the magazine when a key is depressed.

20. In a type composing machine, a type magazine, a type channel adjacent the discharge end of the magazine, a plurality of horizontally movable type-engaging members to force type sidewise from each side of the magazine into said channel, a plurality of depressible keys, one for each type-engaging member, longitudinally shiftable key bars below said type-engaging members, one for each key, a bell crank connection between each key and its respective key bar, and a connection between each key bar and its respective type-engaging member, whereby when a key is depressed, a type corresponding to said key will be forced horizontally from said magazine into the type channel.

21. In a type composing machine, a type magazine, a type channel, said magazine having a discharge end on each side of said channel, a members to force sidewise, type from each side of members to force sidewise type from each side of the magazine into said type channel, a plurality of depressible keys, one for each type-engaging member, connections between said keys and some of the type-engaging members to force type from one discharge end of the magazine into said channel, when keys corresponding to said members are depressed, and connections between the remaining keys and type-engaging members to move them in the opposite direction to force type from the other discharge end of the magazine into the type channel when the keys corresponding to the last-named type engaging members are depressed.

22. In a type composing machine, a type magazine, a type channel, said magazine having a discharge end on each side of said channel, a plurality of horizontally movable type-engaging members to force type from the magazine into said type channel, a plurality of depressible keys, one for each type-engaging member, longitudinally shiftable key bars below said type-engaging members, one for each key, a bell crank connection between each key and its respective key bar, lever connections between the upper marginal portions of said key bars and some of the type-engaging members, and lever connections between the lower marginal portions of said key bars and the other type-engaging members, whereby a part of said type-engaging members will force type horizontally from one discharge end of said magazine into the channel, and the remaining type-engaging members will force type into said channel from the discharge end of the magazine on the opposite side of said channel when keys corresponding to said type-engaging members are depressed.

23. In a type composing machine, a type magazine, a type channel, said magazine having a discharge end adjacent said channel, a plurality of horizontally movable type-engaging members to force type from the magazine into said type channel, a plurality of depressible keys, one for each type-engaging member, a plurality of longitudinally shiftable bars, one for each key, below said type-engaging members, a bell crank connection between each key and its respective shiftable bar, a second shiftable bar, a rocker bar connection between the first and second shiftable bars, a third shiftable bar, a lever connection between the second bar and the third bar, and a slot and key connection between the third bar and a respective type-engaging member.

24. In a type composing machine, a type magazine, a type channel, said magazine having a discharge end adjacent said channel, a plurality of horizontally movable type-engaging members to force type from the magazine into said type channel, a plurality of vertically depressible keys, one for each type-engaging member, a plurality of thin, longitudinally shiftable bars below said type-engaging members, a connection between each key and a respective bar to shift the same when a key is depressed, a transverse key on the lower surface of each type-engaging member, each transverse key spanning a plurality of said shiftable bars, the shiftable bar corresponding to a particular type-engaging member being formed with a narrow slot to receive the key on said member to shift the latter when a vertical key is depressed, and also formed with wide slots which clear the other transverse keys when said shiftable bar is moved by its respective vertical key.

25. In a type composing machine, a type magazine, a type channel, said magazine having a discharge end on each side of said channel, a plurality of horizontally movable type-engaging members to force type from the magazine into said type channel, a plurality of vertically depressible keys, one for each type-engaging member, a plurality of upper longitudinally shiftable bars below said type-engaging members, certain type-engaging members adapted to force type from one discharge end of the magazine into the type channel and the remaining type-engaging members adapted to force type from the opposite discharge end of said magazine into the type channel, connections between the upper bars and their respective type-engaging members, a plurality of lower shiftable bars, one for each key, a connection between each key and its respective lower bar, two groups of intermediate shiftable bars, connections between the intermediate bars of one group and a group of upper bars to shift them in one direction when their respective keys are depressed, to cause type to be forced from one discharge end of the magazine by their respective type-engaging members, and connections between the remaining intermediate bars and the remaining upper bars to shift them in the opposite direction when their respective keys are depressed to cause type to be forced from the opposite discharge end of the magazine by their respective type-engaging members.

26. In a type composing machine, a type magazine, said magazine having a discharge end on each side of said channel, a plurality of horizontally movable type-engaging members to force type from the magazine into said type channel, a plurality of depressible keys, one for each type-engaging member, lower longitudinally shiftable bars, one for each key, a bell crank connection between each key and its respective longitudinally shiftable bar, two groups of intermediate shiftable bars, pivotal connections between the intermediate bars of one group and a group of lower shiftable bars, whereby the bars of that group may be moved in the same direction as their respective lower bars when the latter are shifted by their respective keys, connections between the intermediate bars of the other group and their respective lower bars whereby the bars of the latter group may be moved in the opposite direction to their respective lower bars when the latter are shifted by their respective keys, and connections between the intermediate bars of each group with respective type-engaging members, whereby a part of said members will discharge type from one side of said magazine into the type channel, and the remaining type-engaging members will discharge type from the opposite side of said magazine into said channel.

27. In a type composing machine, a type magazine containing upper and lower case character type, a discharge in said magazine for the upper case type and a discharge in said magazine for the lower case type, a plurality of depressible keys corresponding to said characters, a type channel, a group of type-engaging members for discharging upper case type horizontally into said channel, and a group of type-engaging members, at the side of the first members, for discharging lower case type horizontally into said channel, actuating connections between the depressible keys and the type-engaging members, and shift means for altering the positions of said connections whereby, after the shift means are actuated in one direction, upper case type will be discharged horizontally from the magazine into the channel when keys corresponding to said characters are depressed, and lower case type will be discharged into said channel when the same keys are depressed after the shift means are actuated in the opposite direction.

28. In a type composing machine, a type magazine containing upper and lower case character type, a discharge in said magazine for the upper case type and a discharge in said magazine for the lower case type, a plurality of depressible keys corresponding to said characters, a type channel, a group of type-engaging members for discharging upper case type horizontally into said channel, and a group of type-engaging members, at the side of the first members, for discharging lower case type horizontally into said channel, toggle connections between the depressible keys and the type-engaging members, and shift means for altering the positions of said toggle connections whereby, after shift means are actuated in one direction, upper case type will be discharged horizontally from the magazine into the channel when keys corresponding to said characters are depressed, and lower case type will be discharged into said channel when the same keys are depressed after the shift means are actuated in the opposite direction.

29. In a type composing machine, a type magazine containing upper and lower case character type, a discharge in said magazine for the upper case type and a discharge in said magazine for the lower case type, a plurality of depressible keys corresponding to said characters, a type channel, a group of type-engaging members for discharging upper case type horizontally into said channel, and a group of type-engaging members, at the side of the first members, for discharging lower case type horizontally into said channel, a plurality of longitudinally shiftable key bars, one for each key, a connection between each key and its respective key bar, a lever connection between each key bar and a respective type-engaging member of the upper case group, and a lever connection between each key bar and a respective type-engaging member of the lower case group, a toggle mechanism operatively connected to each group of lever connections, and a shift member for actuating said toggle mechanism to set the lever connections between the key bars and the type-engaging members of one group whereby, when the keys are then depressed, the type of the case characters represented by that group will be discharged from the magazine into the type channel.

30. In a type composing machine, a type magazine containing upper and lower case character type, a discharge in said magazine for the upper case type and a discharge in said magazine for the lower case type, a plurality of depressible keys corresponding to said characters, a type channel, a group of type-engaging members for discharging upper case type horizontally into said channel, and a group of type-engaging members, at the side of the first members, for discharging lower case type horizontally into said channel, a plurality of shiftable bars immediately below each group of type-engaging members and operatively connected thereto, a plurality of lower shiftable key bars operatively connected to said keys, two levers pivotally connected to each key bar, for engagement, one with an upper shiftable bar, corresponding to an upper case character, and the other with an upper shiftable bar corresponding to a lower case character of the key represented by the lower shiftable bar, an intermediate member to which one group of levers is pivoted, and a second intermediate member to which the other group of levers is pivoted, a toggle block, links pivotally connected between said toggle block and the intermediate members, and a shiftable member adapted to rock said toggle block to place one group of levers in position to engage their respective upper shiftable bars when the keys are depressed, to cause type of one case character to be discharged from the magazine into said channel, and at the same time to alter the positions of the other group of levers to make them inoperative to engage the group of upper shiftable bars.

31. In a type composing machine, a type-magazine containing upper and lower case character type, a discharge in said magazine for upper case type and a discharge in said magazine for lower case type, on each side of the machine, four groups of horizontally movable type-engaging members, a horizontal type channel between each pair of said groups to receive upper and lower case character type discharged by said type-engaging members, a plurality of depressible keys corresponding to said characters, means operatively connecting the upper and lower case type-engaging members on one side of the type channel with their respective keys, and means for operatively connecting the upper and lower case type-engaging members on the other side of said type channel with their respective keys, and toggle mechanism to which each of said means is operatively connected for setting said means to actuate the upper or lower case type-engaging members on the side of the type channel the type corresponding to the depressed keys are contained by the magazine.

32. In a type composing machine, a type magazine containing upper and lower case character type, a discharge in said magazine for the upper case type and a discharge in said magazine on the other side of the machine for the lower case type, a group of horizontally movable type-engaging members on each side of the machine, a type channel to receive upper and lower case character type discharged by said type-engaging members, a plurality of depressible keys corresponding to said characters, a plurality of shiftable key bars operatively connected to said keys, lever connections between each group of said type-engaging members and the key bars corresponding to the keys represented by said type-engaging members, and toggle mechanism operatively connected to the group of lever connections on each side of the machine to alter their positions, whereby when a key is depressed, the type of the case desired, corresponding to that key, will be discharged by the type-engaging member for that key on the side of the magazine containing that type.

33. In a type composing machine, a type magazine containing upper and lower case character type, a discharge in said magazine for the upper case type and a discharge in said magazine for the lower case type, on each side of the machine, four groups of horizontally movable type-engaging members, a horizontal type channel between each pair of said groups to receive upper and lower case character type discharged by said type-engaging members, a plurality of depressible keys corresponding to said characters, a plurality of shiftable key bars operatively connected to said keys, lever connections between each group of said type-engaging members and the key bars corresponding to the keys represented by said type-engaging members, a toggle block pivotally mounted between the lever connections, links connecting the latter with said block, and a shift member operatively connected to said toggle block to rock it to alter the positions of the lever connections on each side of it, whereby, when a key is depressed, the type of the case desired, corresponding to that key will be discharged by the type-engaging member for that type on the side of the magazine containing it.

34. In a type composing machine, a type magazine, a type channel, a plurality of horizontally movable type-engaging members for discharging type horizontally from said magazine into said channel, a vertically movable side rail for said type channel, a plurality of depressible keys corresponding to said type-engaging members, a connection between each key and its respective type-engaging member to actuate the latter to discharge a type into channel when said key is depressed, and a connection between each key and the side rail whereby, when a key is depressed, the rail will be lowered below the type-engaging member that forces a type corresponding to that key into the type channel.

35. In a type composing machine, a type magazine, a type channel, a plurality of horizontally movable type-engaging members for discharging type horizontally from said magazine into said channel, a vertically movable side rail for said type channel, a plurality of depressible keys corresponding to said type-engaging members, a plurality of longitudinally shiftable key bars, a key bar being operatively connected to each key, a connection between each key bar and its respective type-engaging member to actuate the latter to discharge a type from the magazine into the type channel when a key is depressed, and a connection between each key bar and the vertically movable side rail to lower the latter to permit the type-engaging member corresponding to the depressed key to discharge across it, into said channel, a type corresponding to said key.

36. In a type composing machine, a type magazine, a type channel, a plurality of horizontally movable type-engaging members for discharging type horizontally from said magazine into said channel, a vertically movable side rail for said channel, a plurality of depressible keys corresponding to the type-engaging members, a transverse rocker bar for lowering said side rail, a plurality of longitudinally shiftable key bars crossing said rocker bar, a key bar being operatively connected to each key, a connection between each key bar and a respective type-engaging member to actuate the latter to discharge a type into said channel when a key is depressed, a projection on the rocker bar for each key bar, and a pin on each key bar for engagement with its respective projection on the rocker bar to actuate the latter to lower the side rail when the key bar is moved longitudinally by a depresed key, whereupon the type-engaging member corresponding to that key may discharge across the rail, into the type channel, a type corresponding to said key.

37. In a type composing machine, a type magazine, a type channel, two groups of horizontally movable type-engaging members for discharging type horizontally from said magazine into said channel, one group of said members on one side of the channel and the other group on the opposite side of said channel, a plurality of depressible keys corresponding to said type-engaging members, vertically movable rails for said channel, a transverse rocker bar for lowering each side rail, said rocker bars being mounted, one ahead of the other, in said machine, a plurality of longitudinally shiftable key bars, crossing said rocker bars, one of said key bars being operatively connected to each key, connections between said key bars and the two groups of type-engaging members to actuate them to discharge a type from the magazine into the type channel when a key is depressed, projections on the rocker bars, and a pin on each key bar for engagement with a projection on its respective rocker bar to actuate the latter to lower the rail on the side of the channel into which a type is discharged by a type-engaging member on that side of the channel when a key corresponding to that type is depressed.

38. In a type composing machine, a type magazine, a horizontal type channel, a plurality of horizontally movable type-engaging members for discharging type horizontally from said magazine into the type channel, a movable side rail for said channel, said side rail formed with cam slots in its end portions, stationary pins projecting through said slots, a spring attached to one end of said rail to hold it in its upper position, a transverse rocker bar, a link connection between said bar and the free end of said rail to draw it downwardly when the rocker bar is rocked in one direction, a plurality of longitudinally shiftable key bars crossing said rocker bar, a key bar being operatively connected to each key, a connection between each key bar and a respective type-engaging member to actuate the latter to discharge a type into said channel when a key is depressed, a projection on the rocker bar for each key bar, and a pin on each key bar for engagement with its respective projection on the rocker bar to actuate the latter to draw the side rail forwardly and downwardly when the key bar is moved longitudinally by a depressed key, whereupon the type-engaging member corresponding to that key may discharge across the rail, into the type-channel, a type corresponding to said key.

39. In a type composing machine, a type magazine, type conveying means adjacent said magazine, and means for ejecting type sidewise from said magazine for travel head first on said type conveying means.

FRANK H. POEPPELMEIER.